(12) United States Patent
Maurer et al.

(10) Patent No.: US 8,029,002 B2
(45) Date of Patent: Oct. 4, 2011

(54) DEVICE FOR SETTING THE SPRING CONSTANT OF A HELICAL SPRING

(75) Inventors: Steffen Maurer, Stuttgart (DE); Matthias Dietz, Bietigheim-Bissingen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 175 days.

(21) Appl. No.: 12/472,413

(22) Filed: May 27, 2009

(65) Prior Publication Data
US 2010/0032916 A1 Feb. 11, 2010

(30) Foreign Application Priority Data
Aug. 7, 2008 (DE) .......................... 10 2008 036 867

(51) Int. Cl.
*B60G 17/02* (2006.01)
*B60G 11/14* (2006.01)
(52) U.S. Cl. .................... 280/5.515; 280/5.519; 267/287
(58) Field of Classification Search .................. 280/5.5, 280/5.512, 5.514, 5.515, 5.519, 6.157, 124.101, 280/124.164, 124.179; 267/166, 166.1, 168, 267/170, 175, 177, 178, 179, 180, 286, 278, 267/288, 289
See application file for complete search history.

(56) References Cited

U.S. PATENT DOCUMENTS

| | | | | |
|---|---|---|---|---|
| 1,751,261 A * | 3/1930 | Wilson | ........................ | 267/166.1 |
| 2,205,586 A * | 6/1940 | Williams | .......................... | 267/4 |
| 3,014,713 A * | 12/1961 | Fenton | .......................... | 267/287 |
| 3,773,346 A * | 11/1973 | Scheublein et al. | ... | 280/124.101 |
| 3,781,033 A * | 12/1973 | Buchwald | .................. | 280/6.157 |
| 4,077,619 A * | 3/1978 | Borlinghaus | .............. | 267/166.1 |
| 4,120,489 A * | 10/1978 | Borlinghaus | .............. | 267/166.1 |
| 4,778,162 A * | 10/1988 | Borlinghaus | ................. | 267/248 |
| 5,263,695 A * | 11/1993 | Bianchi | ......................... | 267/225 |
| 5,310,167 A * | 5/1994 | Noll, Jr. | .......................... | 267/33 |
| 6,186,488 B1 * | 2/2001 | Lauer | ............................ | 267/287 |
| 6,460,840 B2 * | 10/2002 | Imaizumi et al. | ............. | 267/286 |
| 6,550,755 B2 * | 4/2003 | Ehrhardt et al. | .............. | 267/286 |
| 6,712,346 B2 * | 3/2004 | Imaizumi | ..................... | 267/286 |
| 6,726,191 B2 * | 4/2004 | Miyagawa et al. | ........... | 267/170 |
| 6,733,023 B2 * | 5/2004 | Remmert et al. | ...... | 280/124.179 |
| 6,854,720 B2 * | 2/2005 | Aubarede et al. | ............... | 267/34 |
| 6,883,790 B2 * | 4/2005 | Bottene et al. | ................ | 267/180 |
| 7,178,187 B2 * | 2/2007 | Barman et al. | .................... | 5/716 |
| 7,213,802 B2 * | 5/2007 | Soga et al. | ..................... | 267/167 |
| 7,237,780 B2 * | 7/2007 | Ohki | .......................... | 280/6.157 |

(Continued)

FOREIGN PATENT DOCUMENTS

DE 3728462 A1 3/1988

(Continued)

OTHER PUBLICATIONS

Machine translation of DE 10043229.*

*Primary Examiner* — Eric Culbreth
*Assistant Examiner* — Barry Gooden, Jr.

(57) ABSTRACT

An inner and an outer spring plate are disposed, in a radially spaced relationship from one another, on a spring strut cylinder. In a first springing position (normal position), the helical spring is supported with a turn region of small diameter against the inner spring plate. In a second springing position (sports position) of the helical spring, the latter is supported with a turn region of larger diameter against the outer spring plate.

11 Claims, 3 Drawing Sheets

U.S. PATENT DOCUMENTS

| | | | |
|---|---|---|---|
| 7,357,381 B2 * | 4/2008 | Wakamori et al. | 267/179 |
| 7,370,854 B2 * | 5/2008 | Sandhu et al. | 267/169 |
| 7,416,175 B2 * | 8/2008 | Al-Dahhan | 267/220 |
| 7,469,910 B2 * | 12/2008 | Munster et al. | 280/5.514 |
| 7,540,515 B2 * | 6/2009 | Koumura | 280/124.154 |
| 7,644,935 B2 * | 1/2010 | Munster et al. | 280/5.514 |
| 7,841,088 B2 * | 11/2010 | Ogura et al. | 29/896.91 |
| 2001/0035601 A1 * | 11/2001 | Imaizumi et al. | 267/286 |
| 2002/0171223 A1 * | 11/2002 | Chan | 280/124.179 |
| 2004/0036206 A1 * | 2/2004 | Loser et al. | 267/218 |
| 2004/0232648 A1 * | 11/2004 | Ohki | 280/124.164 |
| 2006/0082037 A1 * | 4/2006 | Al-Dahhan | 267/179 |
| 2006/0175787 A1 * | 8/2006 | Munster et al. | 280/124.145 |
| 2009/0072460 A1 * | 3/2009 | Michel | 267/225 |
| 2009/0108546 A1 * | 4/2009 | Ohletz et al. | 280/6.16 |
| 2009/0189360 A1 * | 7/2009 | Fritz | 280/5.519 |
| 2009/0230640 A1 * | 9/2009 | Michel | 280/6.157 |
| 2009/0283977 A1 * | 11/2009 | Michel | 280/6.157 |
| 2010/0065997 A1 * | 3/2010 | Liu | 267/286 |

FOREIGN PATENT DOCUMENTS

DE  10043229 C2  3/2002

* cited by examiner

DEVICE FOR SETTING THE SPRING CONSTANT OF A HELICAL SPRING

CROSS-REFERENCE TO RELATED APPLICATION

This application claims the priority, under 35 U.S.C. §119, of German application DE 10 2008 036 867.9, filed Aug. 7, 2008; the prior application is herewith incorporated by reference in its entirety.

BACKGROUND OF THE INVENTION

Field of the Invention

The invention lies in the automotive field. More specifically, the invention relates to a device for setting the spring constant of a helical spring for a wheel suspension of a motor vehicle. The helical spring has turn diameters of different size and is arranged, tension-mounted, between spring plates.

German patent DE 100 43 229 C2 discloses a helical compression spring system with at least two different part characteristic curves, the system consisting of at least two cylindrical spring regions of different turn diameters, which are connected directly to one another, there being present in the inner space of the turns of the spring region having the larger turn diameter an essentially annular bearing face of a pressure plate, seated on the outer spring end, for the bearing of the spring region of smaller turn diameter. In this case, the bearing face provided in the inner space of the turns of the spring region having the larger turn diameter can be adjusted in height via threads.

Further, German published patent application DE 37 28 462 A1 discloses a helical compression spring for motor vehicles, which possesses a partially progressively running characteristic curve and which consists of two spring parts which are connected in one piece to one another and of which one is designed as a cylindrical spring part and the other adjoining it axially is designed as a barrel-shaped spring part. In this case, the turn diameter of the cylindrical spring part is markedly smaller than the largest turn diameter of the barrel-shaped spring part. The helical compression spring is dimensioned in such a way that a cut-off of springs and turns takes place at the body-side spring support in order to achieve a progressive part of the characteristic curve.

SUMMARY OF THE INVENTION

It is accordingly an object of the invention to provide a device for adjusting the spring constant of a helical spring which overcomes the above-mentioned disadvantages of the heretofore-known devices and methods of this general type and which provides for a device for setting the spring constant of a helical spring for a wheel suspension of a motor vehicle, wherein the device can be set or adjusted in a simple way by means of few components in accordance with selected springing states.

With the foregoing and other objects in view there is provided, in accordance with the invention, a device for setting the spring constant of a helical spring for a wheel suspension of a motor vehicle, comprising:

spring plates and a helical spring tension mounted between said spring plates, said helical spring having turns with mutually different diameters including at least one small diameter turn and at least one large diameter turn;

said spring plates including an inner spring plate and an outer spring plate radially spaced apart from one another on a spring strut cylinder; and said spring plates defining a first springing position of said helical spring, wherein said helical spring is braced with a small-diameter turn against said inner spring plate and a second springing position of said helical spring, wherein said helical spring is braced with a large diameter turn against said outer spring plate.

The advantages mainly achieved by means of the invention are that a setting of the spring constant of a helical spring for a wheel suspension is achieved by cutting out or cutting in spring turns in that an inner and an outer spring plate are arranged, spaced apart radially from one another, on a spring strut cylinder, and, in a first springing position of the helical spring, the latter is supported with a turn region of small diameter against the inner spring plate and, in a second springing position of the helical spring, the latter is supported with a turn region of larger diameter against the outer spring plate only.

Further, according to the invention, it is proposed that, in the first springing position, a lower free end of the helical spring is supported with the turn region of small diameter on the inner spring plate, and further upper spring turns of larger diameter of the helical spring are arranged, free-springing, between an upper fixed spring plate and the inner spring plate. For the selective setting of the selected first and second springing position, it is necessary that the inner spring plate is arranged adjustably in height axially on the spring strut cylinder or a corresponding guide element and the outer spring plate is arranged in a stationary manner on the spring strut cylinder, according to a further variant of the invention both the inner spring plate and the outer spring plate being in each case arranged adjustably in height axially on the spring strut cylinder or a corresponding guide element.

By virtue of this arrangement and possibilities of adjustment of the outer and/or of the inner spring plate and the assignment of the corresponding regions of the spring turns of small and large diameter to the two spring plates, a cut-out or cut-in of spring turns is achieved in a simple way. Thus, in the first springing position, which is designated as the normal position, the lower last turn of the helical spring lies on the inner spring plate and all the further turns arranged above it are free-lying or free-springing.

According to a further proposal, an adjustment of the spring plates takes place in that the inner and the outer spring plate can be activated displaceably in height via an electro-mechanical or hydraulic actuating means. An adjustment of the spring plates in accordance with the conditions prevailing in the driving state is thereby possible.

Thus, according to the invention, it is possible in a simple way, by adjusting the height of the inner spring plate downward, for the assumption of the second springing position, also designated as the sports position, to bring about a hardening of the springing of the remaining helical spring. For this purpose, a lower part of the spring turn or turns of the helical spring is cut out, since part of the helical spring having the larger turn diameter lies only on the outer spring plate.

Further, according to the invention, it is proposed that the inner spring plate have a downward adjustment such that, in the event of a jouncing movement of the wheel, there is a clearance of the last lower spring turn with respect to the inner spring plate. This is necessary so that, during a jouncing movement of the wheel, the cut-out turn or the cut-out turns is or are in engagement again due to the fact that the turn lying on the outer spring plate is lifted off from the latter.

Furthermore, according to the invention, there is provision for the inner spring plate to be adjustable in height simultaneously with the outer spring plate in such a way that a compensation of the spring constants is achieved. By the inner and the outer spring plate being adjusted downward in height, a lowering of the vehicle body is achieved.

Other features which are considered as characteristic for the invention are set forth in the appended claims.

Although the invention is illustrated and described herein as embodied in a device for setting the spring constant of a helical spring, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
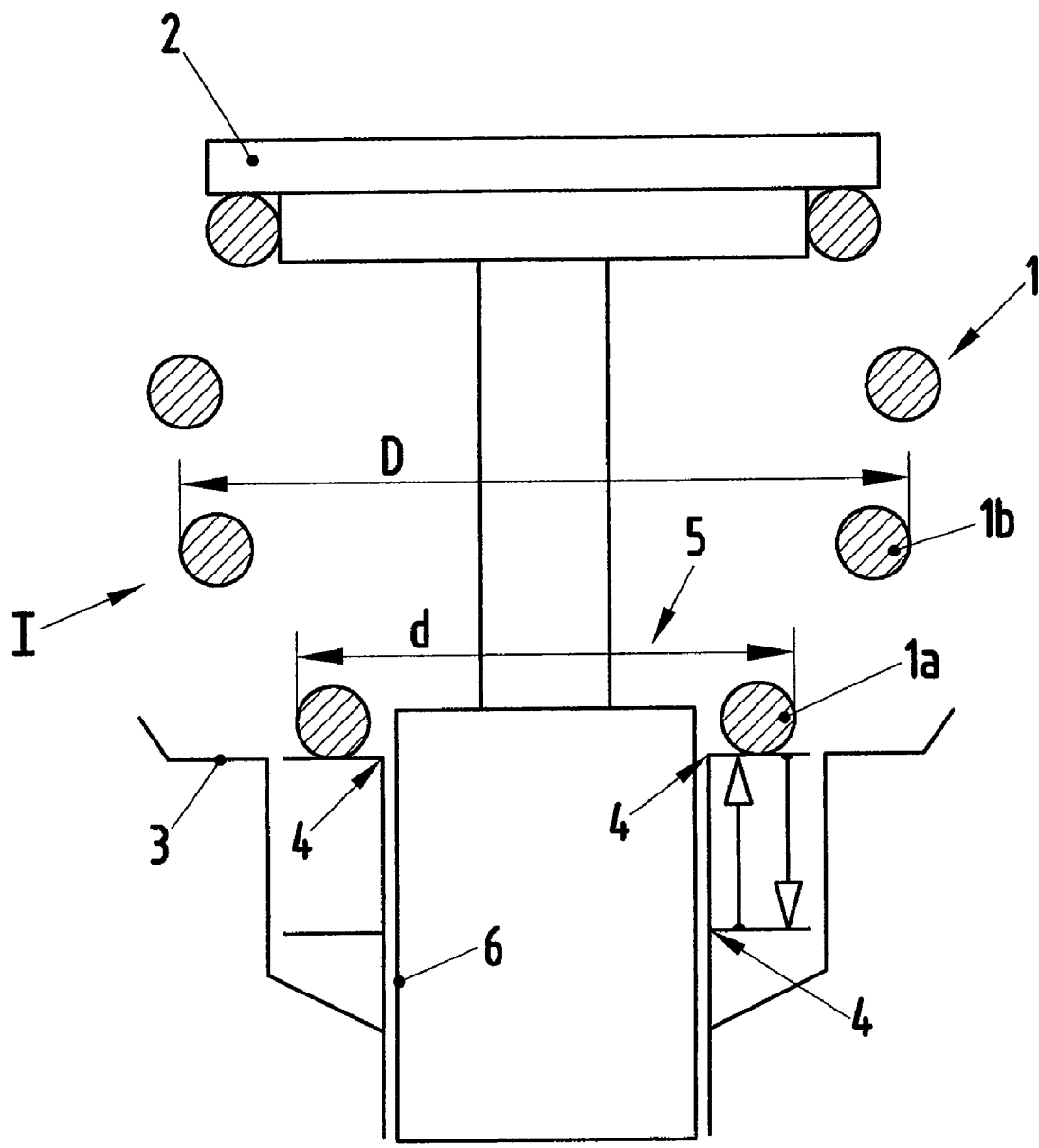
FIG. 1 is a longitudinal section view illustrating a helical spring supported on spring plates and having different turn diameters with possible springing positions.

Referring now to the figures of the drawing in detail and first, particularly, to FIG. 1 thereof, a helical spring 1, for example for a wheel suspension of a motor vehicle, is held, in tension-mounted or biased relationship, between a fixed, upper spring plate 2 and lower spring plates 3 or 4. The lower spring plates include an inner spring plate 4 and an outer spring plate 3. The helical spring 1 is, for example, of barrel-shaped design, but may also consist of two cylindrical portions having different diameters. The helical spring 1 surrounds a spring strut 5, the two spring plates 3 and 4 being arranged on a spring strut cylinder 6 or a corresponding guide element. The helical spring 1 has one or more lower turns 1a having a small diameter d and adjoining further upper turns 1b, etc. having a larger diameter D.

The inner spring plate 4 is disposed adjustably in height on the spring strut cylinder 6, and the outer spring plate 3 is held in a stationary manner on the spring strut cylinder 6. In a further version, both spring plates 3 and 4 may be arranged adjustably in height. An adjustment to the spring plates 3 and 4 may take place via an hydraulic or electromechanical actuating means 7. The spring plates have sleeves which surround the spring strut cylinder 6 and via which the spring plates 3, 4 are guided on the spring strut cylinder 6.

Figure 2:
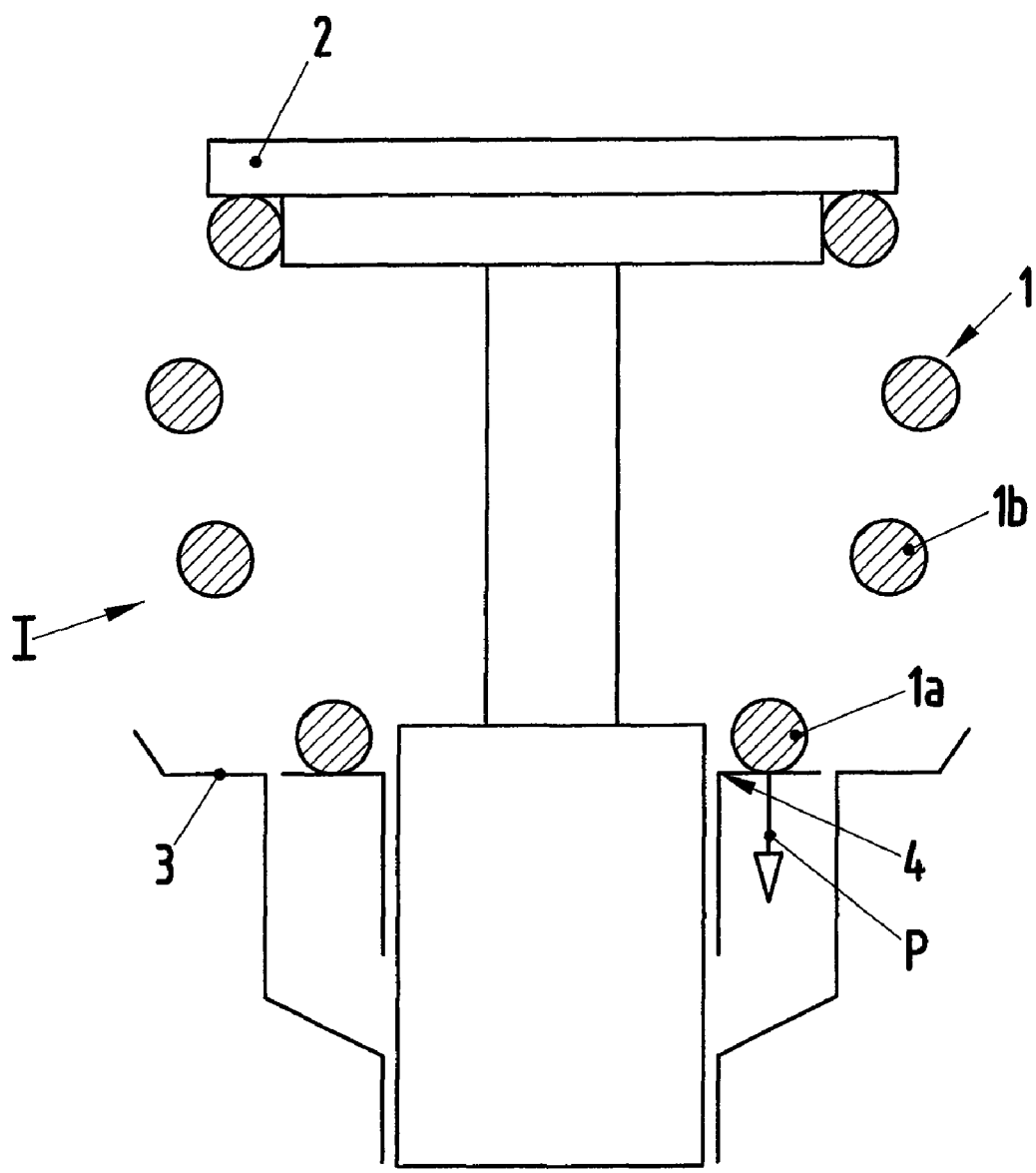
FIG. 2 illustrates the helical spring in a first springing position (normal position)

FIG. 2 shows the helical spring 1 in the first springing position I, the normal position. The lowest spring turn 1a of small diameter d is supported on the inner spring plate 4, and the spring turns 1b etc. of the helical spring 1 which are arranged above it are arranged in a free-lying manner. In this position I, the outer spring plate 3 is arranged at the same height as the inner spring plate 4 and is under no load.

Figure 3:
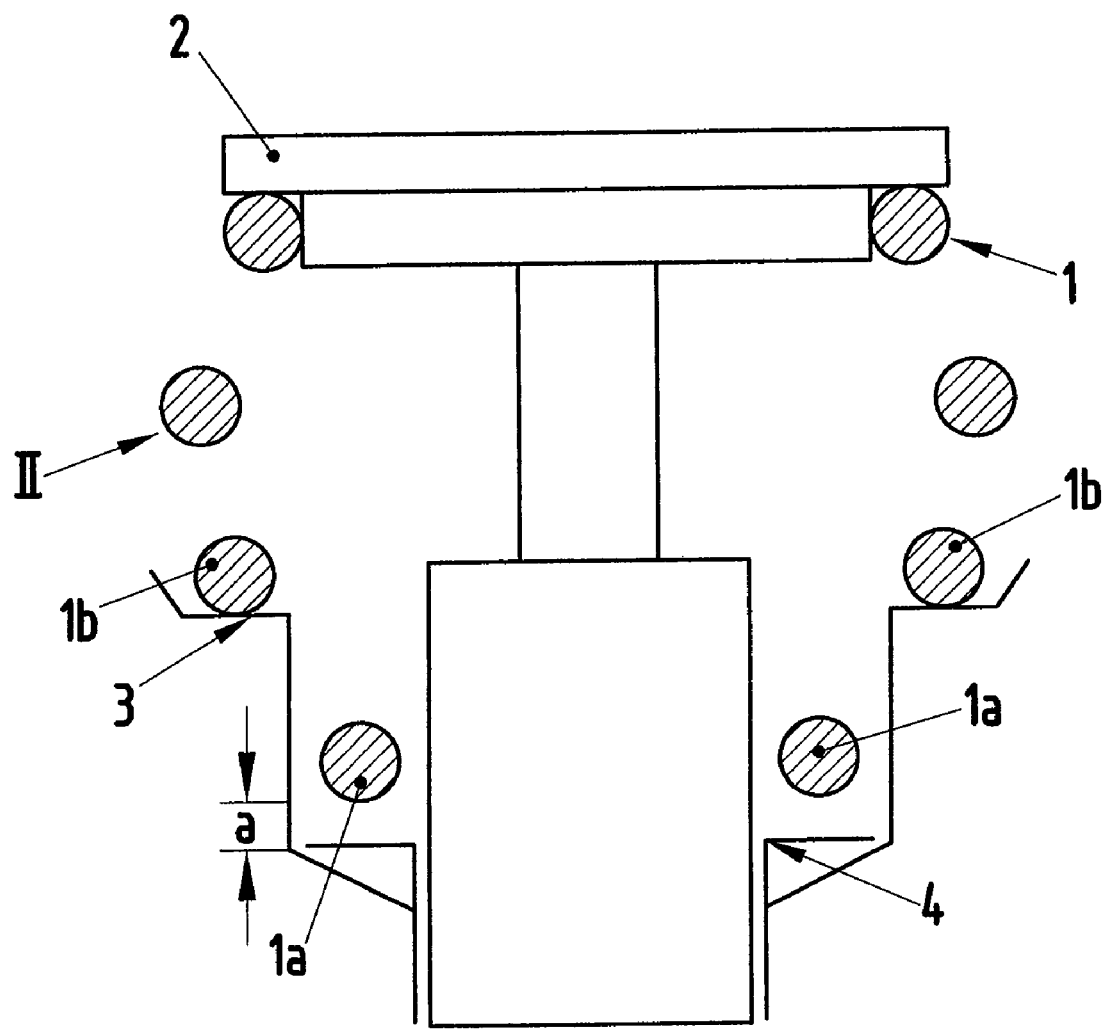
FIG. 3 illustrates the helical spring in a second springing position (sports position).

FIG. 3 shows the helical spring 1 in the second springing position II, the sports position. The upper spring turn 1b of larger diameter D which adjoins the lowest spring turn 1a of small diameter d is then supported only on the outer spring plate 3 as a result of a lowering of the inner spring plate 4, and the lower spring turn 1a is arranged, free-lying, with a clearance a with respect to the inner spring plate 4.

Thus, the lower spring turn 1a is cut out or, if a plurality of lower spring turns are present, these are cut out, so that only the characteristic curve of the springing region of the helical spring 1 is effective. This virtual spring hardening is accompanied by a lowering of the vehicle in this springing position II (i.e., the sports driving position).

In the springing position I (i.e., the comfort driving position), the inner spring plate 4 should have a clearance a with respect to the lower spring turn 1a such that, even in the event of a wheel jounce, the lower spring turn 1a cannot come into place against the spring plate 4.

For lowering the vehicle according to springing position II (sports position), the hardening of the springing, or spring action, is accompanied by a lowering of the vehicle body, so that, in compression, the harder spring constant is therefore established, and, in jounce, the softer spring constant is established, if this is desired. However, this can be compensated by means of a simultaneous adjustment in height of the outer spring plate 4. In general, there is the possibility of setting the height of the vehicle body individually by means of a height adjustment of the two spring plates 3 and 4.

The invention claimed is:

1. A device for setting the spring constant of a helical spring for a wheel suspension of a motor vehicle, comprising:
    spring plates and a helical spring mounted between said spring plates, said helical spring having turns with mutually different diameters including at least one small diameter turn and at least one large diameter turn;
    said spring plates including an inner spring plate and an outer spring plate radially spaced apart from one another on a spring strut cylinder; and
    said spring plates defining a first springing position of said helical spring, wherein said helical spring is braced with a small-diameter turn against said inner spring plate and said outer spring plate does not contact said helical spring, and a second springing position of said helical spring, wherein said helical spring is braced with a large diameter turn against said outer spring plate and said inner spring plate does not contact said helical spring.

2. The device according to claim 1, wherein said spring plates further include a fixed, upper spring plate and wherein, in said first springing position, a lower end of said helical spring is supported with said small-diameter turn on said inner spring plate, and higher-lying, large-diameter spring turns of said helical spring are disposed in a free-springing relationship, between said upper spring plate and said inner spring plate.

3. The device according to claim 1, wherein said inner spring plate is height-adjustably mounted in an axial direction on said spring strut cylinder or a guide element, and said outer spring plate is mounted in a stationary position on said spring strut cylinder.

4. The device according to claim 1, wherein said inner spring plate and said outer spring plate are height-adjustably mounted in an axial direction on said spring strut cylinder or a guide element.

5. The device according to claim 1, which comprises electromechanical or hydraulic actuating means for adjusting a height position of at least one of said inner and outer spring plates.

6. The device according to claim 1, wherein, in said second springing position, said inner spring plate is adjusted downwardly in height such that a last lower small-diameter spring turn comes to be arranged free-lying and with a clearance from said inner spring plate, and an upper, large-diameter spring turn is supported on said outer spring plate.

7. The device according to claim 1, wherein said helical spring is formed with a plurality of lower small-diameter spring turns and, in said second springing position, said lower small-diameter spring turns are arranged free-lying with respect to the inner spring plate.

8. The device according to claim 1, wherein said inner spring plate is adjustable downwardly such that, in an event of a jouncing movement of a respective wheel, a clearance of a lower-most spring turn is maintained with respect to said inner spring plate.

9. The device according to claim 1, wherein said inner spring plate is adjustable in height with respect to said outer spring plate to set a relatively harder spring constant in an event of compression movements of the wheel, and a relatively softer spring constant in a case of jouncing movements of the wheel.

10. The device according to claim 1, wherein said inner spring plate and said outer spring plate are height-adjustable simultaneously with one another such that a compensation of the spring constants is achieved.

11. The device according to claim 1, wherein a downward adjustment in height of said inner spring plate and said outer spring plate causes a lowering of the motor vehicle body.

* * * * *